US010867246B1

(12) United States Patent
Nguyen et al.

(10) Patent No.: US 10,867,246 B1
(45) Date of Patent: Dec. 15, 2020

(54) TRAINING A NEURAL NETWORK USING SMALL TRAINING DATASETS

(71) Applicant: Arimo, LLC, Mountain View, CA (US)

(72) Inventors: Christopher T. Nguyen, Los Altos, CA (US); Binh Han, Mountain View, CA (US)

(73) Assignee: ARIMO, LLC, Mountain View, CA (US)

(*) Notice: Subject to any disclaimer, the term of this patent is extended or adjusted under 35 U.S.C. 154(b) by 744 days.

(21) Appl. No.: 15/685,350

(22) Filed: Aug. 24, 2017

(51) Int. Cl.
*G06N 3/04* (2006.01)
*G06N 20/00* (2019.01)
*G06N 3/08* (2006.01)

(52) U.S. Cl.
CPC .............. *G06N 3/082* (2013.01); *G06N 3/04* (2013.01); *G06N 20/00* (2019.01)

(58) Field of Classification Search
CPC ............. G06N 3/82; G06N 20/00; G06N 3/04
See application file for complete search history.

(56) References Cited

U.S. PATENT DOCUMENTS

| | | | | |
|---|---|---|---|---|
| 2012/0221573 A1* | 8/2012 | Wunsch, II | ......... | G06F 16/2465 707/737 |
| 2016/0155136 A1* | 6/2016 | Zhang | .................. | G06N 3/0454 705/7.29 |
| 2016/0379112 A1* | 12/2016 | He | ........................... | G06N 3/08 706/25 |

OTHER PUBLICATIONS

Bell, S. et al., "Learning Visual Similarity for Product Design with Convolutional Neural Networks," 10 pages.
Kiela, D. et al., "Learning Image Embeddings Using Convolutional Neural Networks for Improved Multi-Modal Semantics," 10 pages.
Li, Y. et al., "Joint Embeddings of Shapes and Images Via CNN Image Purification," 12 pages.
Rousseeuw, P.J., "Silhouettes: A Graphical Aid to the Interpretation and Validation of Cluster Analysis," Journal of Computational and Applied Mathematics, 1987, pp. 53-65, vol. 20.
Wang, J. et al., "Learning Fine-Grained Image Similarity with Deep Ranking," 8 pages.
Wikipedia, "Dynamic Time Warping," Last Edited Sep. 8, 2018, 4 pages, [Online] Retrieved from the Internet<URL:https://en.wikipedia.org/wiki/Dynamic_time_warping>.

* cited by examiner

*Primary Examiner* — Vincent Gonzales
*Assistant Examiner* — Casey R. Garner
(74) *Attorney, Agent, or Firm* — Fenwick & West LLP

(57) ABSTRACT

Training datasets are determined for training neural networks. An input dataset comprising a plurality of samples is provided as training dataset to the neural network. Vector representations of samples of the input dataset are obtained from a hidden layer of the neural network. The samples are clustered using the vector representation. The samples are scored based on a metric that indicates the similarity of the sample to its cluster. A subset of samples is determined by excluding samples that have high similarity with their clusters. The subset of samples is labelled and used for training the neural network.

20 Claims, 7 Drawing Sheets

TRAINING A NEURAL NETWORK USING SMALL TRAINING DATASETS

FIELD OF INVENTION

The disclosure relates to training of neural networks in general and more specifically to training neural networks using small training datasets.

BACKGROUND

Neural networks are used for performing complex tasks, for example, classification tasks in natural language processing, computer vision, speech recognition, bioinformatics, recognizing patterns in images such as skin diseases, and so on. The quality of result of a neural network depends on the quality of training of the neural network. Training such neural networks requires labelling of large amount of training data for identifying different classes of data, e.g. positive and negative examples. For example, training of a neural network may require millions of labelled data points. Labelling such large amount of data points can be expensive and time consuming. Labelling of training data for neural networks that perform complex tasks such as recognizing skin diseases requires input from domain experts and can be expensive. Therefore, conventional techniques for training neural networks can be prohibitively expensive.

SUMMARY

Embodiments perform training of neural networks using small training datasets. The neural network comprises a plurality of layers of nodes that include one or more hidden layers. The neural network is trained using a first training dataset. The neural network is executed to process samples from an input dataset. A vector representation of each sample processed by the neural network is obtained from a particular hidden layer of nodes. A subset of samples from the input dataset is obtained based on distances between vectors representing the samples. The samples of the subset are provided as a second training dataset for retraining the neural network. This process may be repeated.

In an embodiment, the subset of the samples is determined by performing the following steps. The samples of the input dataset are clustered to generate a plurality of clusters. The clustering is based on distances between samples of the input dataset determined based on vectors representing the samples. Each sample is associated with a cluster. For each sample, a score indicative of similarity of the sample with its cluster is determined. A subset of samples is determined by excluding samples having a score indicating high similarity of the samples to the cluster associated with the sample. Each sample of the subset is associated with a label representing an expected result that should be output by the neural network. The labelled samples are provided as training dataset for the neural network.

The steps of training the neural network may be repeated until an aggregate measure of difference between the results output by the neural network and expected results is below a threshold value.

In an embodiment, the neural network represents a deep learning model, for example, a deep learning model for generating description of input images.

In an embodiment, the particular hidden layer is the last hidden layer of the neural network that provides input to an output layer of the neural network.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

The features and advantages described in the specification are not all inclusive and in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

DETAILED DESCRIPTION

Figure 1:
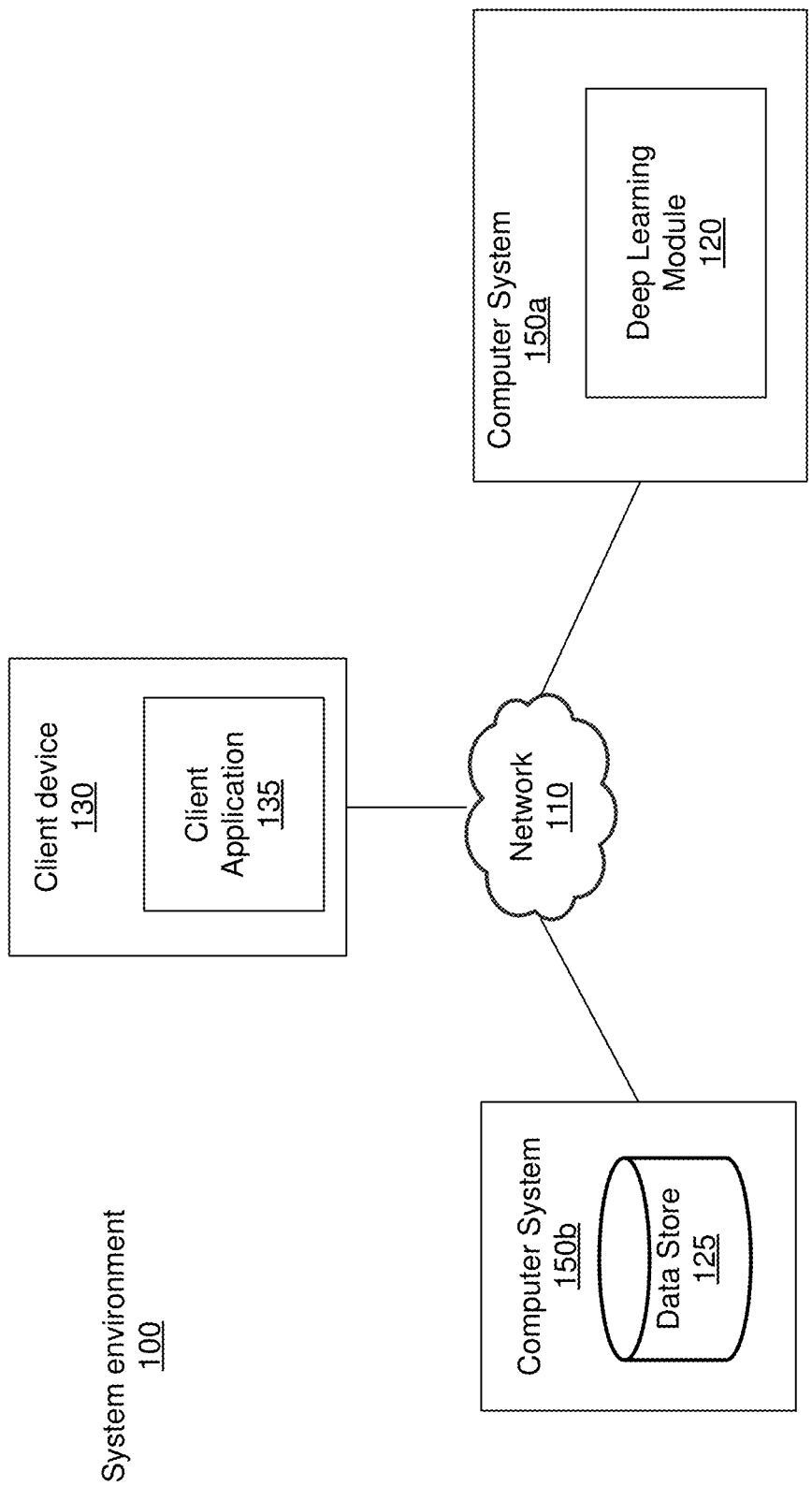
FIG. 1 shows the overall system environment for training and executing neural networks, in accordance with an embodiment of the invention.

FIG. 1 shows the overall system environment for training and executing neural networks, in accordance with an embodiment of the invention. The overall system environment includes one or more computer systems 150, a network 110 and client devices 130. Other embodiments can use more or less or different systems than those illustrated in FIG. 1. Functions of various modules and systems described herein can be implemented by other modules and/or systems than those described herein.

FIG. 1 and the other figures use like reference numerals to identify like elements. A letter after a reference numeral, such as "150a," indicates that the text refers specifically to the element having that particular reference numeral. A reference numeral in the text without a following letter, such as "150," refers to any or all of the elements in the figures bearing that reference numeral (e.g. "150" in the text refers to reference numerals "150" and/or "150" in the figures).

Figure 3:
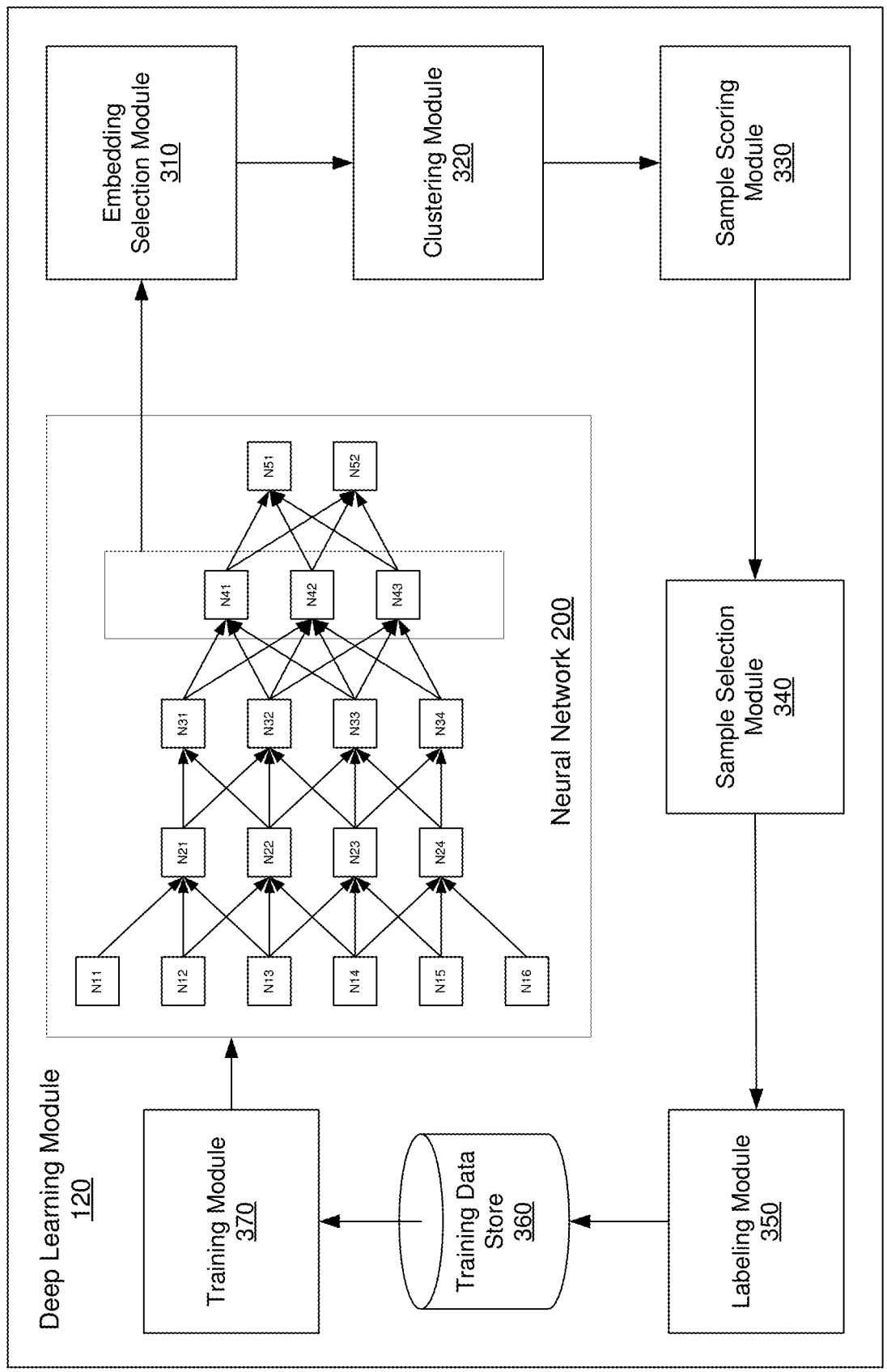
FIG. 3 shows the system architecture of a deep learning module for training neural networks, in accordance with an embodiment.

The computer system 150a includes a deep learning module 120 that performs training of neural networks and also allows users to execute the neural network for processing data. Further details of the deep learning module 120 are illustrated in FIG. 3. The computer system 150b includes a data store 125 that stores data processed by the deep learning module 120. For example, if the neural network of the computer system 150a performs image processing, the data store 125 may store images that are used for training of the neural network and also input data for processing using the neural network.

The client devices 130 are used by users to interact with the computer system 150. The users of the client devices 130 include experts that perform labeling of data points, system administrators that perform various administrative tasks associated with the neural networks or other software executing on computer system 150. In an embodiment, the client device 130 executes a client application that allows users to interact with the big data analysis system 100. For example, the client application executing on the client device 130 may be an internet browser that interacts with web servers executing on computer systems 150.

Systems and applications shown in FIG. 1 can be executed using computing devices. A computing device can be a conventional computer system executing, for example, a Microsoft™ Windows™-compatible operating system (OS), Apple™ OS X, and/or a Linux distribution. A computing device can also be a client device having computer functionality, such as a personal digital assistant (PDA), mobile telephone, video game system, etc.

The interactions between the client devices 130 and the big data analysis system 100 are typically performed via a network 150, for example, via the internet. The interactions between the big data analysis system 100 and the computer systems 120 of the enterprise 110 are also typically performed via a network 150. In one embodiment, the network uses standard communications technologies and/or protocols. In another embodiment, the various entities interacting with each other, for example, the computer systems 150 and the client devices 130 may use custom and/or dedicated data communications technologies instead of, or in addition to, the ones described above. Depending upon the embodiment, the network can also include links to other networks such as the Internet.

Figure 2:
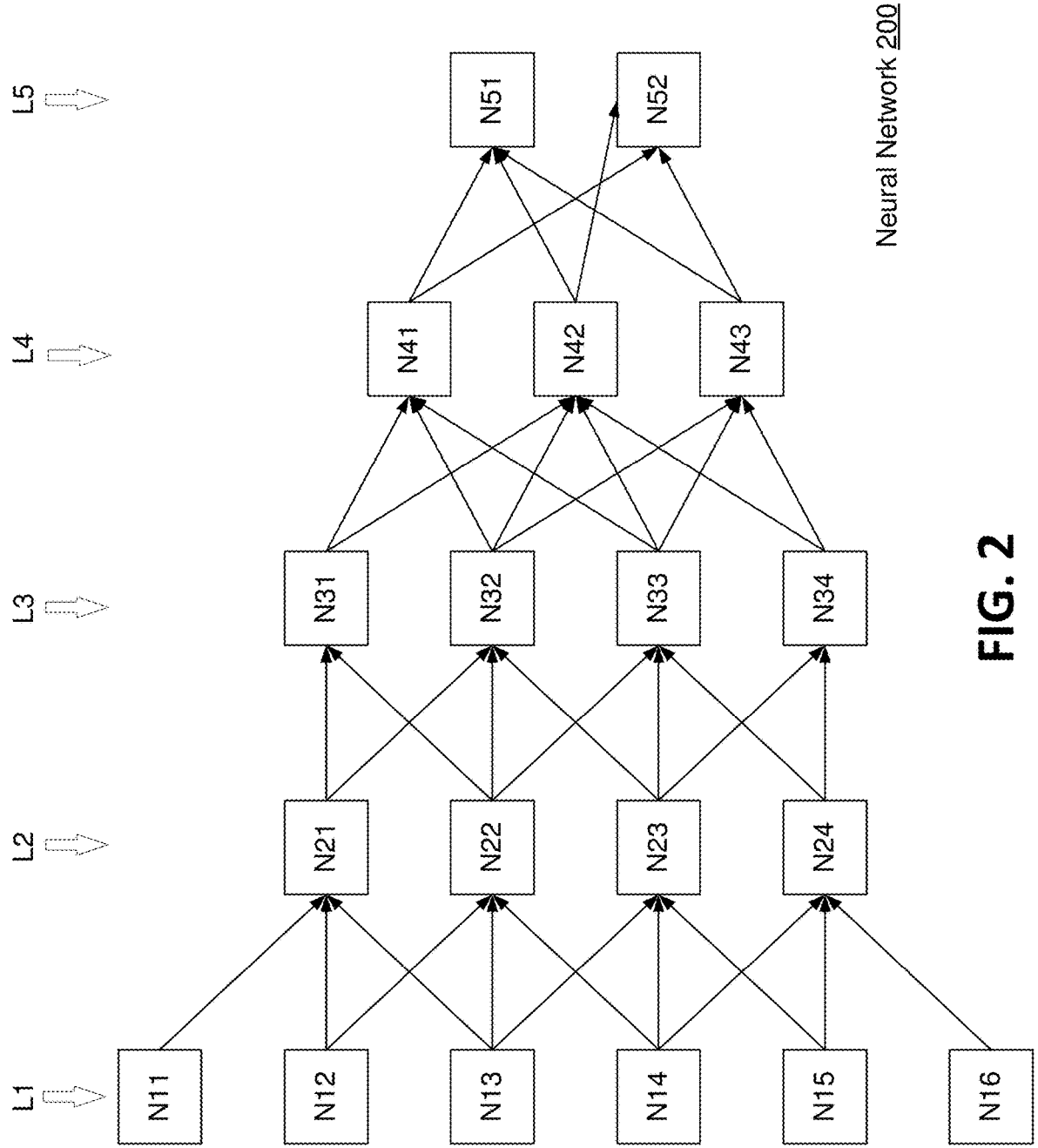
FIG. 2 shows an example neural network, in accordance with an embodiment.

FIG. 2 shows an example neural network, in accordance with an embodiment. In the neural network 200 or any artificial neural networks, nodes are connected together to form a network. The nodes may be grouped together in various hierarchy levels. The nodes may represent input, intermediate, and output data. A node characteristic may represent data such as a pixel and other data processed using the neural network. The node characteristics values may be any values or parameters associated with a node of the neural network. Each node has an input and an output. Each node of the neural network is associated with a set of instructions corresponding to the computation performed by the node. The set of instructions corresponding to the nodes of the neural network may be executed by one or more computer processors. The neural network 200 may also be referred to as a deep neural network.

Each connection between the nodes (e.g., network characteristics) may be represented by a weight (e.g., numerical parameter determined in a training/learning process). In some embodiments, the connection between two nodes is a network characteristic. The weight of the connection may represent the strength of the connection. In some embodiments, a node of one level may only connect to one or more nodes in an adjacent hierarchy grouping level. In some embodiments, network characteristics include the weights of the connection between nodes of the neural network. The network characteristics may be any values or parameters associated with connections of nodes of the neural network.

As shown in FIG. 2, the neural network 200 comprises multiple layers including L1, L2, L3, L4, and L5. Although only five levels of nodes have been shown, additional or fewer levels may exist in other embodiments. Other embodiments may have more or fewer layers. Each layer has one or more nodes. For example, layer L1 has nodes N11, N12, N13, N14, N15, and N16; layer L2 has nodes N21, N22, N23, and N24; layer L3 has nodes N31, N32, N33, and N34; layer L4 has nodes N41, N42, and N43; and layer L5 has nodes N51 and N52.

The first layer, shown as layer L1 of the neural network 200 is the input layer and the last layer, shown as layer L5 is the output layer. The remaining layers are hidden layers, for example, layer L2, L3, and L4. The nodes may be organized as input nodes, hidden nodes, and output nodes. Accordingly nodes of the input layer are input nodes, nodes of the output layer are output nodes, and nodes of the hidden layers are hidden nodes. Nodes of a layer may provide input to another layer and may receive input from another layer. Nodes of each hidden layer are associated with two layers, a previous layer and a next layer. The hidden layer receives the output of the previous layer as input and provides the output generated by the hidden layer as input to the next layer. For example, nodes of hidden layer L3 receive input from the previous layer L2 and provide input to the next layer L4.

In an embodiment, the neural network 200 implements a deep learning model. The neural network 200 may represent an autoencoder that is configured to receive an input and regenerate the input as the output of the neural network. For example, the neural network 200 may receive an image as input and regenerate the image as the output of the neural network. The image generated as an output of the neural network may represent an approximation of the input that does not have an exact match with the input image. A hidden layer of the neural network 200 generates a vector representation of the input image, also referred to as an embedding. The vector representation of the image captures features of the image that allow the neural network 200 to regenerate the image.

System Architecture

FIG. 3 shows the system architecture of a deep learning module for training neural networks, in accordance with an embodiment. The deep learning module 120 comprises the neural network 200, an embedding selection module 310, a clustering module 320, a sample scoring module 330, a sample selection module 340, a labelling module 350, a training data store 360, and a training module 370. In other embodiments, the deep learning module 120 may include additional or less modules than those shown in FIG. 2. Furthermore, specific functionality may be implemented by modules other than those described herein. In some embodiments, various components illustrated in FIG. 3 may be executed by different computer systems 150. For example, the neural network 200 may be executed by one or more processors different from the processors that execute the clustering module 320 or the labelling module 350.

The training data store 360 stores the training dataset for training the neural network 200. The training dataset comprises labelled samples of data processed by the neural network 200. The labels assigned to each sample of data represent the expected output corresponding to the sample data. The training module 370 trains the neural network 200. In an embodiment, the training module 370 trains the neural network by comparing the result of executing the neural network 200 for a sample input data with the expected label associated with the sample input data to determine a measure of error in the generated result. The errors observed in the generated results of various sample input data values are fed back into the neural network 200 to adjust the various weights associated with the nodes and the connections of the neural network. This process is repeated iteratively until an aggregate metric based on the error is determined to be below certain threshold value. The training module 370 repeats the process of training the neural network 200 through multiple iterations.

During each iteration of training, the neural network 200 generates vector representation called embeddings representing the sample input data at a particular layers. An embedding is represented as a vector having one or more dimensions. The embedding selection module 310 selects embeddings from a hidden layer of the neural network 200 for identifying training dataset for a next iteration of training of the neural network. In an embodiment, embedding selection module 310 selects embeddings from the last hidden layer of the neural network 200 that provides input to the output layer of the neural network 200. The embedding selection module 310 provides the selected embeddings as input to the clustering module 320.

In an embodiment, the system receives a dataset in which most of the samples are unlabeled. In an iteration, the neural network is trained on only the labeled samples from the original sample dataset. At the end of each iteration, the trained neural network runs a forward pass on the entire dataset to generate embeddings representing sample data at a particular layer. The system performs clustering on these embeddings to identify which data samples are needed to be labeled. These data samples are then labeled, and are added to the labeled sample set, which is provided as input data for the next training iteration.

The clustering module 320 receives a set of embeddings from the embedding selection module 310. Each embedding represents a sample that was provided as input during a particular iteration to the neural network 200. The clustering module 320 performs clustering of the received set of embeddings and generates a set of clusters, each cluster comprising one or more embeddings. The clustering module 320 uses a distance metric that represents a distance between any two embeddings and identifies clusters of embeddings that represent embeddings that are close to each other according to the distance metric. The clustering module 320 may use a clustering techniques, for example, k-means clustering, distribution-based clustering, hierarchical clustering, and so on.

The sample scoring module 330 determines scores for the samples received by the embedded selection module. The scores determines by the sample scoring module 330 indicate a degree of match between the sample and the cluster to which the sample is assigned. Accordingly, the score measures how similar a sample is to the cluster to which the sample is assigned compared to other clusters. For example, high score for a sample indicates that the sample is very similar to the cluster and a low score indicates that the sample is not very similar to the cluster to which the sample is assigned compared to other clusters.

In an embodiment, the sample scoring module 330 determines Dinternai, an aggregate distance of the sample compared to other samples of the cluster to which the sample is assigned and Dexternai, an aggregate distance between the sample and other clusters or samples assigned to other clusters. The sample scoring module 330 determines the score measuring the similarity of the sample to the cluster to which the sample is assigned based on the values of Dinternai and Dexternai. In an embodiment, the sample scoring module 330 determines a silhouette score for the samples.

The sample selection module 340 selects a subset of samples from the samples provided by the embedding selection module 310. The sample selection module 340 selects the samples based on the scores determined for the samples. The sample selection module 340 selects samples that are determined to have low similarity to the clusters to which the samples are assigned. Accordingly, the sample selection module 340 excludes samples that are determined to have high similarity to the clusters to which they are assigned. In an embodiment, the sample selection module 340 ranks the samples based on their scores. If a high value of score indicates low similarity of the sample to its cluster, the sample selection module 340 selects a subset of high ranking samples. Accordingly, if a low value of the score indicates low similarity of the sample to its cluster, the sample selection module 340 selects a subset of low ranking samples. The sample selection module 340 provides the selected samples to the labeling module 350.

The labeling module 350 determines labels of the samples that are selected by the sample selection module 340. In an embodiment, the labeling module 350 provides the received samples to users via a user interface. The labeling module 350 receives the labels for the selected samples from the users via the user interface. In an embodiment, the task of labeling may be divided among users by providing different samples to different users for labeling. Since the process of selecting a subset of samples in accordance with the embodiments disclosed allows the neural network to be trained by significantly fewer number of samples compared to conventional techniques for training neural networks, the amount of effort required for labeling the samples is much smaller than the amount of effort required for labeling samples using conventional techniques. The labeling module 350 stores the labeled set of samples in the training data store 360.

The deep learning module 120 performs the training of the neural network 200 repeatedly. The sample selection module selects a subset of the embeddings corresponding to the input training dataset processed by the neural network 200. The sample selection module selects more samples which need to be labeled the most. The number of samples in each iteration may be increased compared to the previous iteration. However, the size of the subset labelled is significantly less than the number of samples labelled by conventional techniques, for example, techniques that label the entire dataset.

Overall Process

Figure 4:
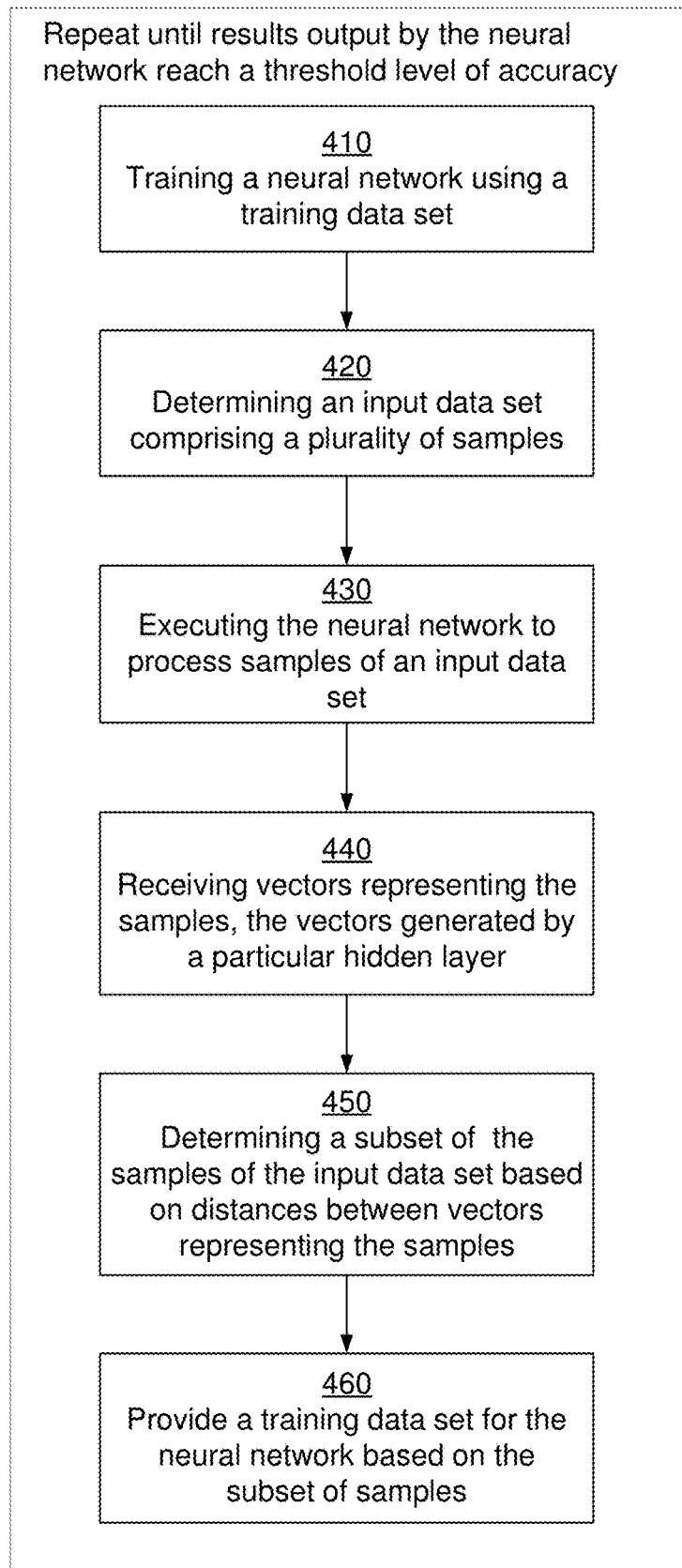
FIG. 4 illustrates a process for training neural networks, according to an embodiment of the invention.
Figure 5:
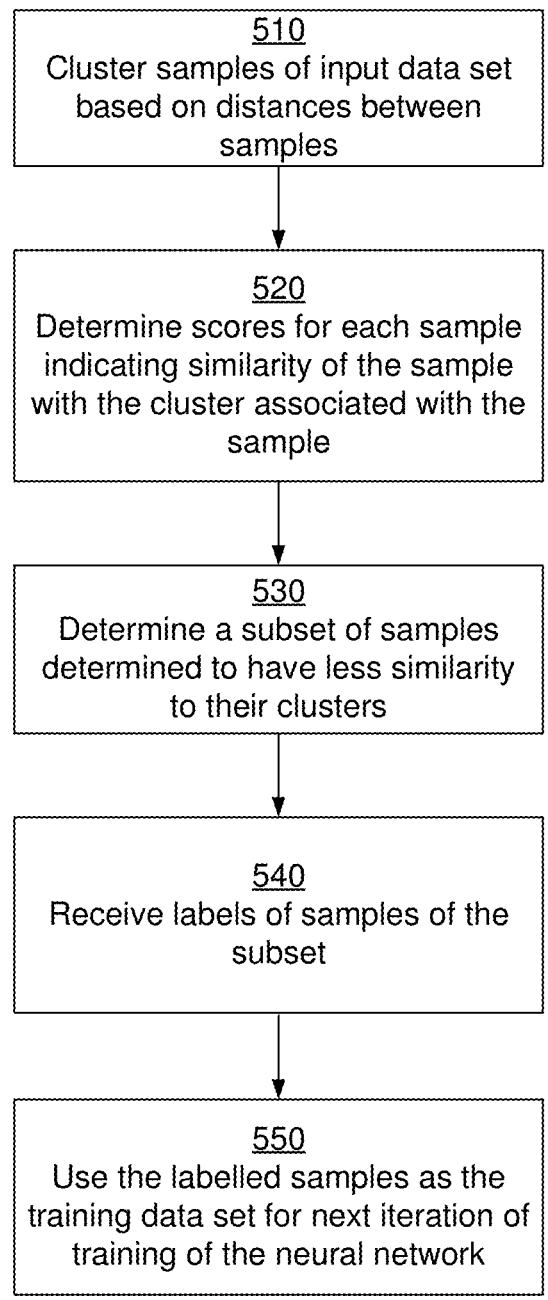
FIG. 5 illustrates a process of determining a set of samples for training the neural network, according to an embodiment of the invention.

The overall process for training a neural network using small training data size is illustrated using FIGS. 4 and 5. The steps illustrated in the process may be performed in an order different from that indicated in FIGS. 4 and 5. Furthermore, the steps may be executed by modules different from those indicated herein.

FIG. 4 illustrates the overall process for training neural networks, according to an embodiment of the invention. The deep learning module 120 performs the following steps repeatedly. The neural network is repeatedly trained using a training dataset determined for that iteration. Each iteration identifies a set of samples for use as a training dataset for the next iteration.

The training module 370 trains 410 the neural network 200 using a training dataset retrieved from the training data store 360. The training dataset comprises samples of input data with the expected results for each sample. For example, a neural network for labelling images includes samples with labels identifying labels for the input images.

The deep learning module 120 determines 420 an input dataset for processing using the neural network 200. The input dataset may be the entire training dataset used for training the neural network 200 or a subset of the training dataset or may include other samples. The deep learning module 120 executes 420 the neural network 200 to process samples of the input dataset.

The embedding selection module 310 receives 440 embeddings from a hidden layer of the neural network 200. Each embedding comprises a vector representation of an input sample processed by the neural network 200. The vector representation is generated by nodes of a particular hidden layer of nodes. The embedding selection module 310 may receive 440 the embeddings from the nodes that provide the input to the output layer of the neural network 200. In an embodiment, the embedding selection module 310 receives 440 the embeddings from the last hidden layer of the neural network 200 that provides the input to the output layer of the neural network 200.

The deep learning module 120 selects a subset of samples from the input dataset. The subset of samples is selected based on distances between vectors representing the samples. Further details of the process for selecting the subsets are shown in FIG. 5 and described herein. The deep learning module 120 stores the subset of samples in the training data store 360 as a training dataset. The deep learning module 120 provides 460 the samples of the subset as a training dataset for retraining the neural network during the next iteration of the process illustrated in FIG. 5.

The deep learning module 120 repeats the above iterations until the result generated by the neural network 200 provides more than a threshold level of accuracy. In an embodiment, the deep learning module 120 determines an accuracy metric based on an aggregate measure of difference between the results output by the neural network and expected results. The deep learning module 120 repeats the iterations that retrain the model until the accuracy metric reaches below a threshold value.

FIG. 5 illustrates a process of determining a set of samples for training the neural network, according to an embodiment of the invention.

The clustering module 320 performs clustering of samples of the input dataset to generate a plurality of clusters. The clustering module 320 associates each sample with a cluster. The clustering is performed based on distances between samples of the input dataset. The clustering module 320 determines the distance based on vectors generated by nodes of the hidden layer.

The sample scoring module 330 determines 520 for each sample of the input dataset, a score indicative of similarity of the sample with the cluster associated with the sample. The sample selection module 340 determines a subset of samples from the input dataset. In an embodiment, the sample selection module 340 determines the subset by excluding samples of the input data that have a score indicating high similarity of the sample to the cluster associated with the sample. Accordingly, the sample selection module 340 includes samples of the input data in the subset if the sample has a score indicating low similarity of the sample to the cluster associated with the sample.

The labelling module 350 associates each sample of the subset with a label representing an expected result that should be output by the neural network for the sample. In an embodiment, the labelling module receives the associations between samples and the labels from users via a user interface. The deep learning module 120 stores the labelled samples as a training dataset in the training data store 360 for training the neural network 200 for the next iteration.

Figure 6:
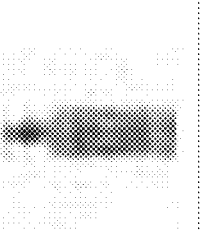
FIG. 6 shows an example data obtained using a neural network trained using the process of FIG. 4, according to an embodiment of the invention.

FIG. 6 shows an example data obtained using a neural network trained using the process of FIG. 4, according to an embodiment of the invention. The example data shown in FIG. 6 is obtained using neural network configured to generate a description of an image. For example, the neural network may be used for automatic generation of descriptions of images representing products. Column 610 shows images representing inputs to a deep neural network used for generating descriptions 630, 640, and 650. An autoencoder neural network is used for generating embeddings representing the images shown in column 610. Column 620 shows the output of the autoencoder neural network.

As shown in FIG. 6, the images regenerated by the autoencoder may not match the corresponding input images exactly. However, the autoencoder generates a vector representation of the images that is used to determine a sample set for training the deep neural network used for generating the description of the images. The description is generated using various sample sizes, for example, using a neural network trained at different iterations on the increased label sample sizes. As shown in FIG. 6, the descriptions in column 630 are generated using 100 samples, the descriptions in column 640 are generated using 300 samples, the descriptions in column 630 are generated using 500 samples. As shown in FIG. 6, the quality of description generated improves as the sample size increases. However, even the largest sample size shown is small compared to conventional techniques that may use several thousands of samples for training the neural network models.

Computer Architecture

Figure 7:
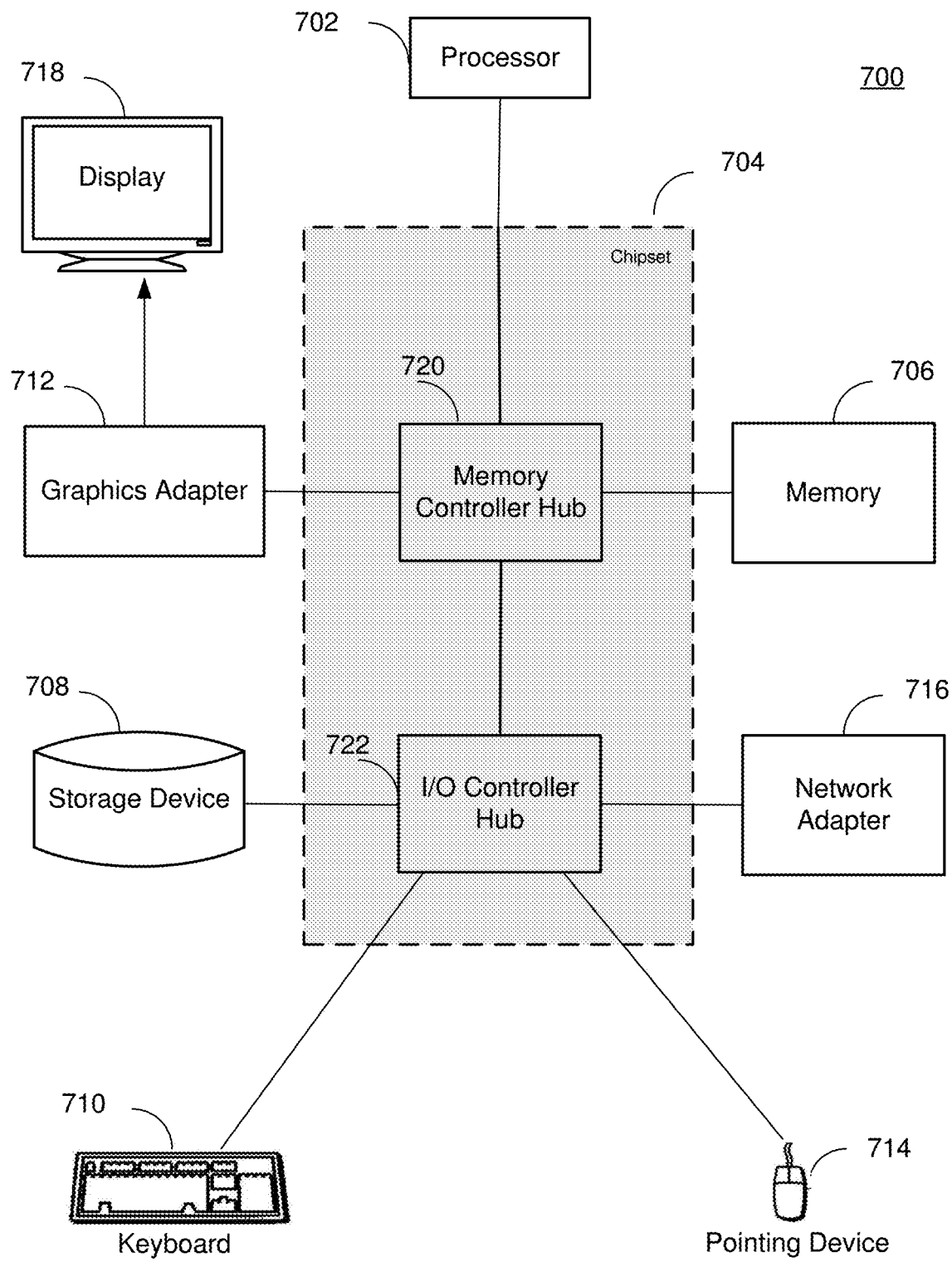
FIG. 7 is a high-level block diagram illustrating an example of a computer system, in accordance with an embodiment.

FIG. 7 is a high-level block diagram illustrating an example system, in accordance with an embodiment. The computer 700 includes at least one processor 702 coupled to a chipset 704. The chipset 704 includes a memory controller hub 720 and an input/output (I/O) controller hub 722. A memory 706 and a graphics adapter 712 are coupled to the memory controller hub 720, and a display 718 is coupled to the graphics adapter 712. A storage device 708, keyboard 710, pointing device 714, and network adapter 716 are coupled to the I/O controller hub 722. Other embodiments of the computer 700 have different architectures.

The storage device 708 is a non-transitory computer-readable storage medium such as a hard drive, compact disk read-only memory (CD-ROM), DVD, or a solid-state memory device. The memory 706 holds instructions and data used by the processor 702. The pointing device 714 is a mouse, track ball, or other type of pointing device, and is used in combination with the keyboard 710 to input data into the computer system 700. The graphics adapter 712 displays images and other information on the display 718. The network adapter 716 couples the computer system 700 to one or more computer networks.

The computer 700 is adapted to execute computer program modules for providing functionality described herein. As used herein, the term "module" refers to computer program logic used to provide the specified functionality. Thus, a module can be implemented in hardware, firmware, and/or software. In one embodiment, program modules are stored on the storage device 708, loaded into the memory 706, and executed by the processor 702. The types of computers 700 used can vary depending upon the embodiment and requirements. For example, a computer may lack displays, keyboards, and/or other devices shown in FIG. 7.

Alternative Embodiments

It is to be understood that the Figures and descriptions of the present invention have been simplified to illustrate elements that are relevant for a clear understanding of the present invention, while eliminating, for the purpose of clarity, many other elements found in a typical distributed system. Those of ordinary skill in the art may recognize that other elements and/or steps are desirable and/or required in implementing the embodiments. However, because such elements and steps are well known in the art, and because they do not facilitate a better understanding of the embodiments, a discussion of such elements and steps is not provided herein. The disclosure herein is directed to all such variations and modifications to such elements and methods known to those skilled in the art.

Some portions of above description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for displaying charts using a distortion region through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A computer-implemented method comprising:
   training a neural network using a first training dataset, the neural network comprising a plurality of layers of nodes, the plurality of layers of nodes including a hidden layer of nodes;
   receiving an input dataset comprising a plurality of samples;
   executing the neural network to process samples of the input dataset;
   for each sample of the input dataset, receiving a vector representing the sample, the vector generated by nodes of the hidden layer of nodes;
   selecting a subset of samples from the input dataset based on distances between vectors representing the samples;
   for each sample of the subset, associating the sample with a label representing an expected result that should be output by the neural network for the sample; and
   providing the samples of the subset as a second training dataset for retraining the neural network.

2. The method of claim 1, wherein determining the subset of samples comprises:
   clustering samples of the input dataset to generate a plurality of clusters, the clustering associating each sample with a cluster, the clustering based on distances between vectors representing the samples;
   for each sample of the input dataset, determining a score indicative of similarity of the sample with the cluster associated with the sample; and
   excluding one or more samples from the input dataset based on the scores to determine the subset of samples.

3. The method of claim 2, wherein the one or more samples are excluded from the input dataset responsive to each of the one or more samples having a score indicating high similarity of the sample to the cluster associated with the sample.

4. The method of claim 1, wherein the plurality of layers of nodes represents a sequence of layers of nodes comprising a plurality of hidden layers, wherein the hidden layer is the last hidden layer from the plurality of hidden layers.

5. The method of claim 1, wherein the neural network further comprises an output layer of nodes for outputting the result of executing the neural network, wherein the hidden layer represents nodes that provide input to the output layer of nodes.

6. The method of claim 1, further comprising, repeating the steps of:
   receiving a second input dataset comprising a second plurality of samples;
   executing the neural network to process samples of the second input dataset;
   for each sample of the second input dataset, receiving a vector representing the sample, the vector generated by nodes of the hidden layer of nodes;
   selecting a second subset of samples from the second input dataset based on distances between vectors representing the samples; and
   providing the samples of the subset as a third training dataset for retraining the neural network.

7. The method of claim 6, wherein repeating the steps is performed until an aggregate measure of difference between the results output by the neural network and expected results is below a threshold value.

8. The method of claim 1, wherein the neural network represents a deep learning model.

9. The method of claim 8, wherein the deep learning model is configured to generate a natural language description of an input image.

10. The method of claim 1, wherein the neural network is an autoencoder configured to receive an input and regenerate the input as output of the neural network.

11. A computer readable non-transitory storage medium, storing instructions for:
   training a neural network using a first training dataset, the neural network comprising a plurality of layers of nodes, the plurality of layers of nodes including a hidden layer of nodes;
   receiving an input dataset comprising a plurality of samples;
   executing the neural network to process samples of the input dataset;
   for each sample of the input dataset, receiving a vector representing the sample, the vector generated by nodes of the hidden layer of nodes;
   selecting a subset of samples from the input dataset based on distances between vectors representing the samples;
   for each sample of the subset, associating the sample with a label representing an expected result that should be output by the neural network for the sample; and
   providing the samples of the subset as a second training dataset for retraining the neural network.

12. The computer readable non-transitory storage medium of claim 11, wherein the stored instructions further comprise instructions for:
   clustering samples of the input dataset to generate a plurality of clusters, the clustering associating each sample with a cluster, the clustering based on distances between vectors representing the samples;
   for each sample of the input dataset, determining a score indicative of similarity of the sample with the cluster associated with the sample; and
   excluding one or more samples from the input dataset based on the scores to determine the subset of samples.

13. The computer readable non-transitory storage medium of claim 12, wherein the one or more samples are excluded from the input dataset responsive to each of the one or more samples having a score indicating high similarity of the sample to the cluster associated with the sample.

14. The computer readable non-transitory storage medium of claim 11, wherein the plurality of layers of nodes represents a sequence of layers of nodes comprising a plurality of hidden layers, wherein the hidden layer is the last hidden layer from the plurality of hidden layers.

15. The computer readable non-transitory storage medium of claim 11, wherein the neural network further comprises an output layer of nodes for outputting the result of executing the neural network, wherein the hidden layer represents nodes that provide input to the output layer of nodes.

16. A computer-implemented system comprising:
   a computer processor; and
   a computer readable non-transitory storage medium storing instructions thereon, the instructions when executed by a processor cause the processor to perform the steps of:
      training a neural network using a first training dataset, the neural network comprising a plurality of layers of nodes, the plurality of layers of nodes including a hidden layer of nodes;
      receiving an input dataset comprising a plurality of samples;
      executing the neural network to process samples of the input dataset;
      for each sample of the input dataset, receiving a vector representing the sample, the vector generated by nodes of the hidden layer of nodes;
      selecting a subset of samples from the input dataset based on distances between vectors representing the samples;
      for each sample of the subset, associating the sample with a label representing an expected result that should be output by the neural network for the sample; and
      providing the samples of the subset as a second training dataset for retraining the neural network.

17. The computer-implemented system of claim 16, wherein the computer readable non-transitory storage medium further stores instructions for:
   clustering samples of the input dataset to generate a plurality of clusters, the clustering associating each sample with a cluster, the clustering based on distances between vectors representing the samples;
   for each sample of the input dataset, determining a score indicative of similarity of the sample with the cluster associated with the sample; and
   excluding one or more samples from the input dataset based on the scores to determine the subset of samples.

18. The computer-implemented system of claim 17, wherein the one or more samples are excluded from the input dataset responsive to each of the one or more samples having a score indicating high similarity of the sample to the cluster associated with the sample.

19. The computer-implemented system of claim 16, wherein the plurality of layers of nodes represents a sequence of layers of nodes comprising a plurality of hidden layers, wherein the hidden layer is the last hidden layer from the plurality of hidden layers.

20. The computer-implemented system of claim 16, wherein the neural network further comprises an output layer of nodes for outputting the result of executing the neural network, wherein the hidden layer represents nodes that provide input to the output layer of nodes.

* * * * *